No. 808,320. PATENTED DEC. 26, 1905.
T. L. VALERIUS.
COVER FOR CREAM RIPENERS AND THE LIKE.
APPLICATION FILED SEPT. 13, 1904.

Witnesses:- Inventor:-
Theodore L. Valerius

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

COVER FOR CREAM-RIPENERS AND THE LIKE.

No. 808,320.     Specification of Letters Patent.     Patented Dec. 26, 1905.

Application filed September 13, 1904. Serial No. 224,326.

*To all whom it may concern:*

Be it known that I, THEODORE L. VALERIUS, of Fort Atkinson, Jefferson county, Wisconsin, have invented a certain new, useful, and Improved Cover for Cream-Ripeners and the Like, of which the following is a specification.

My invention relates to improved means for closing the tops of vats, and has particular reference to improvements in the covers belonging to large cream-ripening vats.

The object of my invention is to provide a vat-cover which will serve to exclude from the vat all external atmospheric odors and also insects; and a further object of my invention is to provide means for easily and quickly elevating such covers to afford access to the vat.

My invention consists generally in the combination of a vat or tank (which at the upper edge is provided with a water-holding trough) with a strong tight cover adapted to rest upon the upper edge of the vat and having a depending flange which occupies the trough referred to, whereby an odor and insect tight joint is formed between the vat and its cover; and, further, my invention consists in the combination of a cover of the foregoing construction with parallel arms or links which connect the same with the vat or an adjacent support, together with means for operating said arms or links to elevate said cover and swing the same backward to open the vat; and, further, my invention consists in various details of construction and in combinations of parts, all as hereinafter described, and particularly pointed out in the claims.

My invention will be more readily understood by reference to the accompanying drawings, forming part of this specification, in which—

Figure 1:
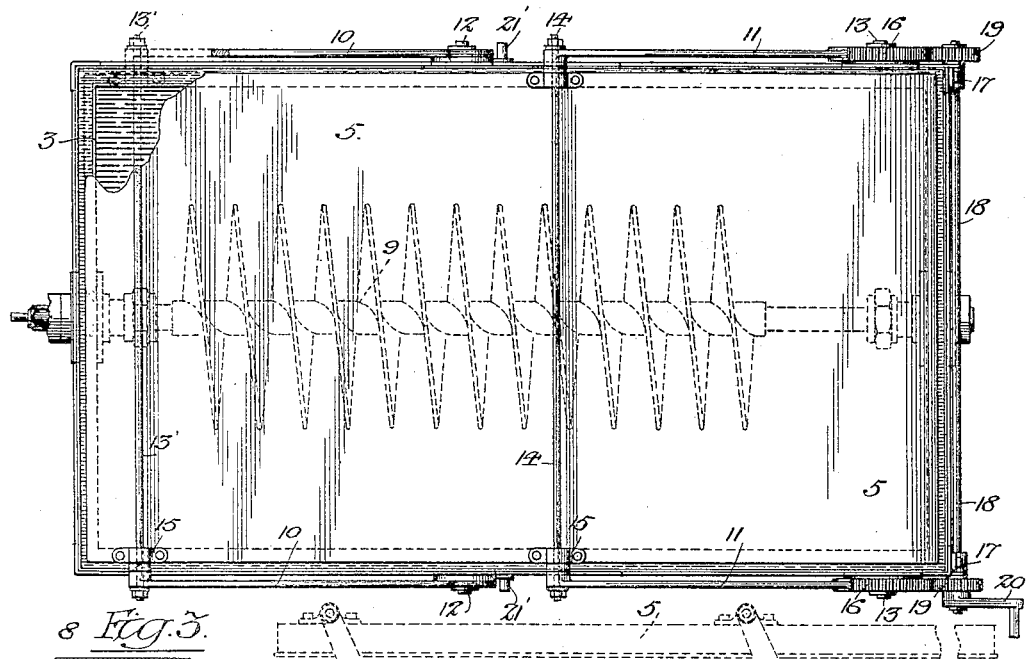
Figures 2, 3:
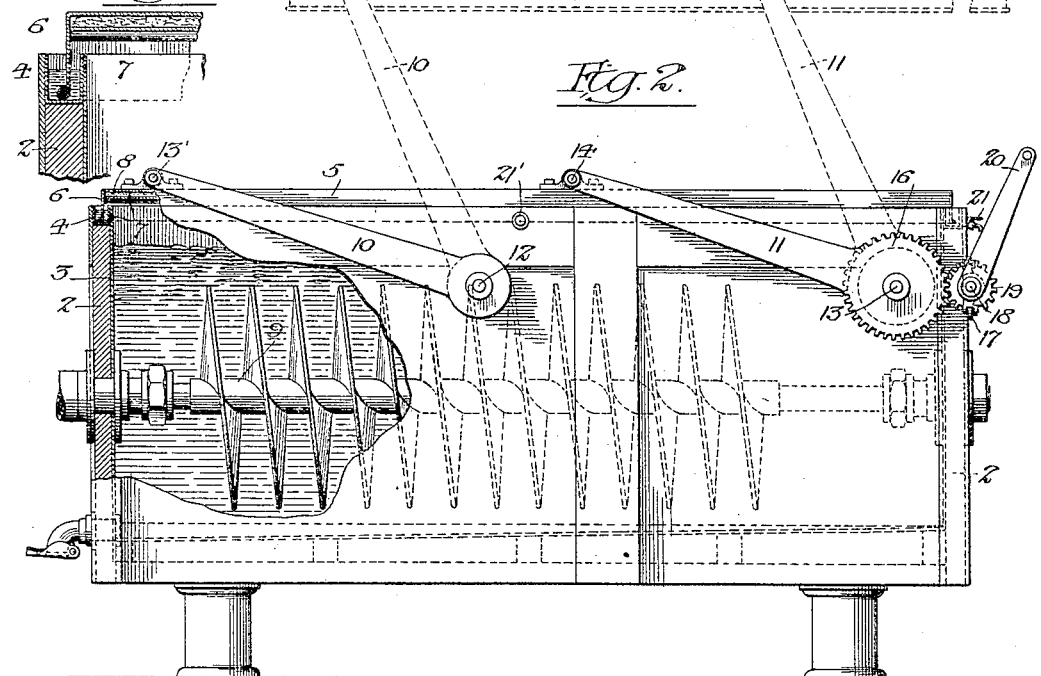

Figure 1 is a plan view of a cream-ripener vat that is equipped with a cover and cover-elevating devices embodying my invention. Fig. 2 is a side elevation of the same, a portion of the side of the vat being broken away to show the interior of the vat; and Fig. 3 is a large sectional detail showing the water-containing joint formed by the trough in the edge of the vat and the cover-flange.

My invention is adaptable to various uses, but is particularly directed toward the improvement of cream-ripening vats and to milk and cream vats generally. This being the case, I will describe my invention in connection with a cream-ripener.

The ripening of cream is a process of fermentation, and certain steps of said process consist in heating and cooling the cream to respectively accelerate and retard fermentation.

Ripening cream is particularly receptive of odors and flavors, and to preserve the same from detrimental atmospheric odors, also insects, it is the practice to provide ripener-vats with tight covers with a view to excluding external influences. During the period of fermentation of cream the noxious gases and odors present therein are evolved and liberated and should be permitted to escape into the atmosphere; but with the ordinary cream-ripener having a cover sufficiently tight to exclude the outer air the cream is so little aerated that the objectionable odors and flavors are retained therein and may be detected in the butter which is ultimately made from the cream. I conceive that cream to be ripened properly should be practically open to the atmosphere and yet defended against atmospheric odors, dust, and insects, and to this end I provide my cream-ripeners with strong heavy covers and employ a non-metallic shallow liquid seal of so little power to resist pressure that air will flow into the vat freely whenever there is a tendency to a vacuum therein and which will at the same time permit the free escape of gases and vapors which may be liberated from the cream and collect in the top of the vat. A cover of this character is of necessity heavy in contrast with the covers of other vats. In addition to this fact, the particular ripener for which I have invented said cover is of great size and the cover so heavy that it cannot be readily lifted off the vat, and I have been compelled to seek means for readily raising or operating the cover to open and close the vat, said means making it very easy to raise and throw back a heavy cover in a moment of time whenever it is necessary to gain or permit access to the ripener-vat.

Referring now to the drawings, 2 represents the ripener-vat, having a metal lining 3, which at the upper edge is formed to provide a shallow liquid or water trough 4. 5 is a cover, and 6 is a depending, preferably metal, flange, which extends entirely around the cover and fits into the trough, which in like manner extends entirely around the upper edge of the vat 2. The flange may rest on the bottom of the trough, if desired, but does not make a tight joint therewith. The trough is kept partly filled with water, which body of liquid is divided into two portions by the flange on the cover. The cover is usually made of metal, upon either a wooden or metal frame, and is preferably provided with ribs 7 on its under surface, the ends of which rest upon the top of the vat, leaving a number of openings 8 between the upper edge of the vat and the under side of the cover 5. In this manner I form a tortuous air and gas passage leading from the exterior downward into the trough, then upward inside of flange 7, and thence through openings 8 into vat, and vice versa. As the trough is filled with liquid, it will be evident that any air or gases bubbling through said liquid will to a certain extent be filtered and robbed of contained vapors and impurities, the joint being meantime tightly closed against the entrance of dust, insects, &c., which would detrimentally affect the contents of the vat.

The vat contains a stirring or emulsifying device 9, one function of which is to heat and cool the contents of the vat. This heating and cooling of the contained cream causes fluctuations of pressure in the upper part of the vat; but because of the peculiar joint employed and which offers only slight resistance to the entrance or exit of air and gases the pressure in the upper part of the tank is at all times substantially equalized with the external atmospheric pressure. In this manner plenty of air is supplied to the upper surface of the body of cream in the vat, and at the same time all danger of disrupting the vat by internal pressure or lack of pressure is avoided.

A cream-ripener vat of the kind herein illustrated is many feet in length, breadth, and height, and the cover therefor is far too heavy to admit of its being lifted off by one or even two men. As it is frequently necessary to inspect and test the cream undergoing treatment in the vat and also to fill, empty, and clean the vat, I find that said cover is practically useless without efficient means for raising and supporting it. To this end I employ four arms or links 10 10 and 11 11, pivoting or journaling the same upon studs 12 and 13, respectively arranged on or extending from plates that are secured to the sides of the vat some distance below the top or upper edge thereof. The upper ends of the arms or links are attached to or journaled upon the ends of two transverse shafts 13' and 14, that extend across the top of the cover 5. The shafts 13' and 14 are held in small blocks or bearings 15 on the cover of sufficient strength to support the weight of the cover. The lower ends of the arms or links 11 are of great diameter and are formed with gear-teeth 16, each arm comprising a large gear-wheel and the arm proper extending therefrom. The gear-wheel and arm are preferably integral; but it is obvious that these parts may be formed separately and secured together by suitable means. On the rear end of the vat I provide blocks or bearings 17 for a shaft 18 and on the ends of this shaft employ gear-pinions 19, that mesh with the gears 16 of the rear pair of lifting-arms 11. The shaft is provided with a long crank 20, and when this is turned to the left the arms 11 and the parallel arms 10, with cover 5, will be slowly elevated. The crank is usually turned until the arms pass beyond their vertical positions and rest against back-stops 21 on the sides of the vat. It will be observed that the first portion of the movement of the links is substantially vertical, and this movement permits the flange 7 to rise from the seal-trough 4 freely and without contact with the sides of said trough. The weight of the cover and of the arms is such that there is little danger of the cover being disturbed by even a heavy jar or shock when in its raised position; but I prefer to lock the cover in place by inserting a key between the teeth of the gear and pinion 16 19 at such times. On the removal of this pin or key (not shown) the cover may by reversing the motion of the crank be easily and gently lowered into place on the top of the vat. By using the cross-shaft 18 and the two pinions 17 17, meshing with gears 16, I avoid all danger of racking or twisting the cover or the supporting-arms. 21 is a cock for emptying the groove or trough 4. Said trough should be emptied frequently, as the water takes on impurities from the air and gas flowing or bubbling through the same and quickly becomes polluted.

It is obvious that numerous modifications of my invention will readily suggest themselves to one skilled in the art, and I therefore do not confine my invention to the specific constructions herein shown and described.

Having thus described my invention, I claim as new and desire to secure by Letters Patent—

1. A vat containing a sealed trough at its upper edge, in combination with a cover having a depending flange, adapted to enter said trough or groove, and parallel motion mechanism for elevating said cover substantially as described.

2. In apparatus of the class described, a vat or tank provided with a shallow trough or groove in its upper edge, in combination with a cover having a depending flange to fit said groove, parallel arms or links having stationary pivots at their lower ends, and having their upper ends attached to said cover, and means for operating said arms and links to raise and lower said cover, substantially as described.

3. In apparatus of the class described, a vat or tank containing a shallow trough in its upper edge, in combination with a cover having a vertical flange to fit such trough or groove, parallel links or arms having their lower ends pivoted upon said vat, and having their upper ends pivoted upon said cover, and gearing for operating a pair of said arms to raise and lower said cover, substantially as described.

4. In apparatus of the class described, a vat, in combination with a cover therefor, parallel links or arms pivoted upon the side of the vat, said cover being pivotally attached to the upper ends of said links or arms, one pair of said arms being provided with gears, and gear-pinions meshing with said gears, for operating the same, to elevate or lower said cover, substantially as described.

5. In apparatus of the class described, a vat, in combination with cover therefor, parallel arms having their ends pivotally attached to said vat and cover respectively, and a crank mechanism for forcibly elevating said arms and therewith said cover, substantially as described.

6. In apparatus of the class described, a vat containing a trough, 4, in its upper edge, means for draining said trough, a cover having a flange depending in said trough, two pairs of parallel arms having their lower ends pivoted upon said vat, means for pivotally attaching said cover to the upper ends of said arms, gears upon certain of said arms, gear-pinions meshing therewith, and a pinion-operating crank, substantially as described.

7. In apparatus of the class described, a vat in combination with a cover therefor, studs upon the sides of said vat, pairs of arms pivoted upon said studs, means for pivotally attaching said cover to the upper ends of said arms, a shaft upon the end of said vat, and gearing connecting said shaft and one pair of said arms, substantially as described.

In witness whereof I have hereunto set my hand, this 6th day of September, 1904, at Fort Atkinson, Jefferson county, Wisconsin, in the presence of two witnesses.

THEODORE L. VALERIUS.

Witnesses:
A. I. KYLE,
CHAS. W. FERRIS.